Dec. 28, 1965  S. J. WINTON  3,225,727

METHOD OF FORMING FOIL PANS

Filed May 1, 1963  2 Sheets-Sheet 1

INVENTOR.

BY STANLEY J. WINTON

ATTORNEYS

Dec. 28, 1965  S. J. WINTON  3,225,727
METHOD OF FORMING FOIL PANS
Filed May 1, 1963  2 Sheets-Sheet 2

INVENTOR.
BY STANLEY J. WINTON
ATTORNEYS

United States Patent Office 3,225,727
Patented Dec. 28, 1965

3,225,727
METHOD OF FORMING FOIL PANS
Stanley J. Winton, Wilmette, Ill., assignor to Kitchens of Sara Lee, Inc., Chicago, Ill., a corporation of Maryland
Filed May 1, 1963, Ser. No. 277,175
10 Claims. (Cl. 113—120)

This invention relates in general to a pan construction and in partciular to a foil pan construction.

Cake and pie pans known in the prior art have been formed from rectangular flat sheets of material through the means of mating male and female molds. When a round tapered pan or a cylindrical pan is formed by this method, there is necessarily an excess of material which is flattened by the mating molds. Insofar as cost is concerned, in manufacturing pans of this type the cost of the material is more important even than the labor cost. Therefore, if means can be provided to reduce the amount and the gauge or thickness of the pan material without reducing its structural strength, a considerable saving can be provided.

Accordingly, it is an object of this invention to construct a foil pan of a lighter gauge material than would otherwise be possible without reducing its structural strength and also to construct the foil pan in a manner that makes full use of all the material forming the foil pan.

It is another object of this invention to provide a method of forming a foil pan construction wherein the walls of the pan are ribbed, increasing the strength thereof, and thereby permitting a thinner gauge material to be utilized in the pan construction.

It is another object of this invention to provide a method for forming a foil pan construction wherein the entire pan is formed from a continuous and elongated strip of foil thereby using less material to form the foil pan.

It is another object of this invention to provide a method for forming a foil pan construction from a single elongated strip of foil material wherein a bottom peripheral shelf is provided in the pan which will support an independent individual pan bottom, thereby enabling the pan bottom to be of a material other than the foil material.

Briefly, in a preferred embodiment of the invention, a generally round cake or pie pan having triangular ribs formed in the tapered sidewalls is provided. A bottom peripheral shelf for supporting an independent bottom piece and a top portion adapted to engage a cover are also provided in the pie or cake pan. The pan is manufactured from a continuous and elongated sheet of foil material and is formed by being sequentially passed through a series of rollers that perform separate functions. The sheet of foil is first passed through a pair of cooperating rollers that form an L-shaped top in the sheet of foil material. The sheet of foil material is then presented to a second pair of cooperating rollers having teeth cut therein for forming triangular shaped ribs in the main body portion of the sheet of foil material to form tapered sidewalls. After the triangular ribs have been formed in the sheet of foil material, the sheet of foil material is then sent through a third set of cooperating rollers wherein the end opposite the end having the L-shaped top formed thereon is turned over to form a bottom shelf upon which an independent bottom piece can be supported. If a series of pans are to be made from a continuous strip of foil material, cutting means are provided to cut the formed sheet material from the roll of foil material. The two ends of the sheet of formed foil material are connected to one another by any means. Finally, an independent bottom portion is positioned on and supported by the bottom shelf.

Other objects, features and advantages of the invention will be more clearly seen if the following is viewed in light of the accompanying drawings of which:

FIG. 1 illustrates apparatus for performing the initial step in the forming of a circular foil pan from a continuous strip of foil;

FIG. 2 discloses apparatus for performing a subsequent step in the process of forming a circular foil pan from a strip of foil;

Figure 1:
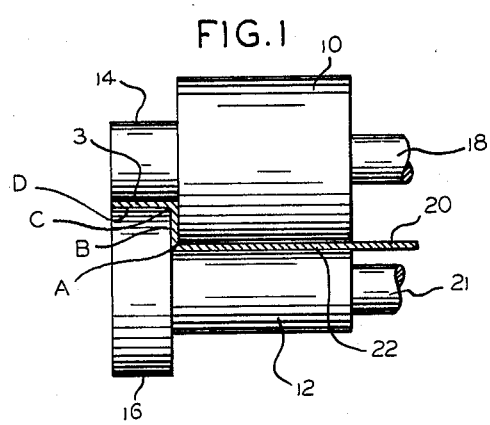

Referring now to the drawings, apparatus is diagrammatically illustrated for performing the steps in the process of forming a generally circular foil pan from a strip of foil material. The foil pan comprises three separate sections, a top section 3 upon which a cover may be placed and secured to the foil pan, a side wall section 22 having triangular ribs 45 formed therein to form tapered side walls and a bottom shelf section 60 upon which an independent bottom of any suitable material can be supported. The steps in the process are performed by passing the strip of foil material sequentially through a series of rollers that operate to form the different sections of the foil pan construction. The side wall section 22 is tapered for nesting one foil pan in the other when the foil pans are in storage, for example. The side wall 22 has ribs 45 formed therein to provide structural strength enabling the thickness of the side walls to be reduced without any loss in structural strength. In the preferred embodiment of the invention, the top section 3 is shown to be L-shaped However, there are many ways of securing a cover to a pan, all of which could be applied in this situation. Therefore, the particular formation of the top section of the foil pan construction is in no way limiting on the inventive process.

Referring now to FIG. 1, wherein apparatus is diagrammatically illustrated for forming the top L-shaped top section 3 of the foil pan construction. A pair of rollers 10 and 14 are secured to a rotatable shaft 18 and a pair of cooperating rollers 12 and 16 are secured to a rotatable shaft 21. The rollers and the rotatable shafts are positioned relative to one another as illustrated in FIG. 1 by supporting means not shown but which can be readily provided by one skilled in the art. Rollers 10 and 12 and 14 and 16 as well as rollers 10 and 16 are positioned so as to be separated by at least a distance equal to the thickness of the foil material 20 being operated on by these rollers. The foil pan material 20 is illustrated in cross section in FIG. 1 and is shown as the foil pan material passes through the mentioned rollers.

Initially, the rollers 10 and 12 and 14 and 16 must be positioned far enough apart so that the flat unbended foil pan material 20 can be inserted therebetween. Means can be readily provided for performing this function and the shafts 18 and 20 need only be moved further apart. After the foil pan material 20 is inserted between the mentioned rollers they are returned to their operable position as shown in FIG. 1. When the rollers 10, 12, 14 and 16 are returned to their operable positions as illustrated in FIG. 1 they bend the foil pan construction material at A to form the right angle surface B, and further bend the foil pan construction 20 at C to form a surface D at right angles with surface B. The end result is an L-shaped top section 3 and as previously stated, the L-shaped top section 3 is utilized in the preferred embodiment of the invention. However, there is no reason why top sections of the different configurations could not be utilized, depending on the desired method of securing the pan cover to the foil pan. The foil pan cover will rest and lie on surface B of the foil pan material 20 when the covers are placed in the completed foil pan. The surface D of the foil pan construction 20 can then be bent over so as to lie over the inserted covers in a substantially parallel plane to surface B to thereby secure the covers to the completed foil pan.

The distance that the roller 12 and the roller 14 are spaced apart and consequently the diameter of the roller 16 is determined by the desired width of the surface B of the top section 3 of the foil pan construction. After the foil pan material 20 has been inserted between the mentioned rollers and the foil pan material initially bent by the re-positioning of the rollers 10, 12, 14 and 16 as illustrated in FIG. 1, the rotatable shafts 18 and 21 having the mentioned rollers attached thereto are rotated thereby drawing the foil pan material 20 through the rollers to thereby form the L-shaped top section 3. Means for insuring that the foil pan material 20 is properly guided through the rollers can be readily provided and do not form any part of this invention.

Figure 2:
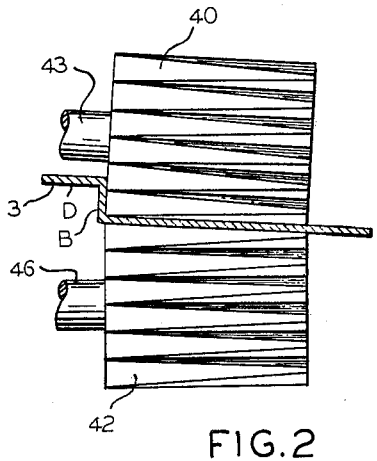
Figure 4:
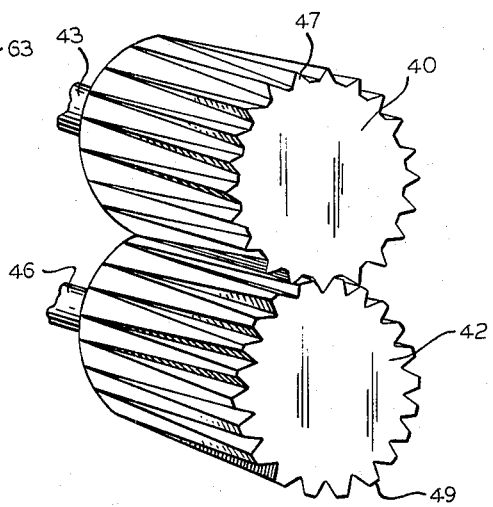
FIG. 4 is an enlarged view of the rollers illustrated in FIG. 2.

Referring now to FIGS. 2 and 4, there is illustrated the rollers for forming triangular-shaped ribs 45 in the main body portion 22 of the foil pan material 20. As previously stated, ribs are formed in the main body portion 22 of the foil pan material 20 for the purpose of adding strength to the side walls of the resultant foil pan construction and the ribs are shaped triangularly to cause the side walls to taper from the top portion to the bottom shelf portion for the purpose of providing a resultant tapered foil pan construction that can be nested one in the other to aid in storage of the foil pans until they are called upon for use.

The triangular ribs 45 are formed in the main body portion 22 of the foil pan material 20 by means of gear shaped rollers 40 and 42. Rollers 40 and 42 are attached to rotatable shafts 43 and 46, respectively. Mating teeth like members 47 and 49 are formed in the rollers 40 and 42 respectively and these teeth vary in a straight-line function in depth from one end to the other and the depth of the teeth is determined by the taper desired in the wall 22 and this is determinative of the angular relation between the shaft 43 and shaft 46 of the rollers 40 and 42 respectively. Teeth like members 47 are formed in the roller 40 and can be formed by any known method and teeth 47 can be considered to be triangularly shaped formations increasing in height and width in a straight line function from the end of roller 40 adjacent shaft 43 to the opposite end of roller 40. Mating teeth 49 are formed in roller 42 by any known method and teeth 49 increase in depth and narrow in width in a straight line function from the end of roller 42 adjacent shaft 46 to the opposite end of roller 42. The respective height and width of teeth 47 and depth and width of teeth 49 are matched and these dimensions determine the size of the triangular ribs 45 formed in the side wall 22 and consequently the taper of the side wall 22 can be readily understood. Shafts 43 and 46 and consequently the axis of rollers 40 and 42, respectively, must be inclined toward one another and this angle is determined by the angle of increase in height of teeth 47 and the angle of decrease of depth of the teeth 49 proceeding from their respective ends adjacent shafts 43 and 46, respectively. When the strip of foil material is positioned between rollers 40 and 42 and these rollers are rotated the teeth 47 and 49 form triangularly shaped ribs 45 in the foil pan material 20 as can be readily understood. Means for positioning shafts 43 and 46 and consequently rollers 40 and 42 and for rotating the same can be readily provided by one skilled in the art.

The final step in the process consists of bending in the bottom section 60 of the foil pan material 20 and the bottom section 60 is the section opposite the top section 3 previously described. The formation of the bottom section 60 of the foil material 20 provides a shelf upon which an independent bottom piece can be supported.

Figure 3:
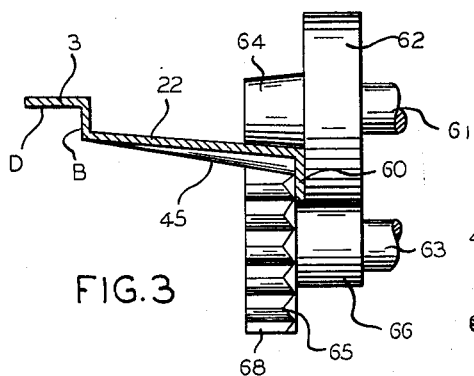
FIG. 3 illustrates apparatus for performing a further step in the process of forming a circular foil pan from a strip of foil.

FIG. 3 diagrammatically illustrates apparatus for performing this step. A shelf section 60 is formed on the bottom of the foil material 20 by the rollers 62, 64, 66 and 68 as shown in FIG. 3. Initially, as was the situation when the top section 3 was formed in the foil material 20, the rollers 62, 64 and 66, 68 respectively must be positioned far enough apart so that the bottom portion of the foil material 20 can be inserted in between these rollers. Then the rollers 62, 64 and 66, 68 are moved toward one another to the position shown in FIG. 3, and during this movement, the initial bending or forming of the bottom shelf portion 60 is accomplished.

Rollers 62 and 64 are secured to a rotatable shaft 61 and rollers 66 and 68 are secured to a rotatable shaft 63. Suitable triangular slots 65 are cut in the roller 68 so as to enable roller 68 to properly move over the triangular shaped ribs 45 formed in the main body portion 22 of the foil material 20 and therefore there is the additional requirement that proper indexing between the triangular slots 65 in the roller 68 and the triangular ribs 45 in the main body portion 22 must be provided. Means can be provided by one skilled in the art for rotating the shafts 61 and 63 and for positioning and aligning the foil material 20 as it passes through the rollers 62, 64 and 66, 68 to form the bottom shelf 60. The roller 64 is tapered so as to continuously ride on the tapered surface of the side wall 22 on the side thereof opposite the formed triangular ribs 45. The width of the bottom shelf section 60 is determined by the distance between rollers 64 and 66 and consequently the diameter of roller 62.

Figure 5:
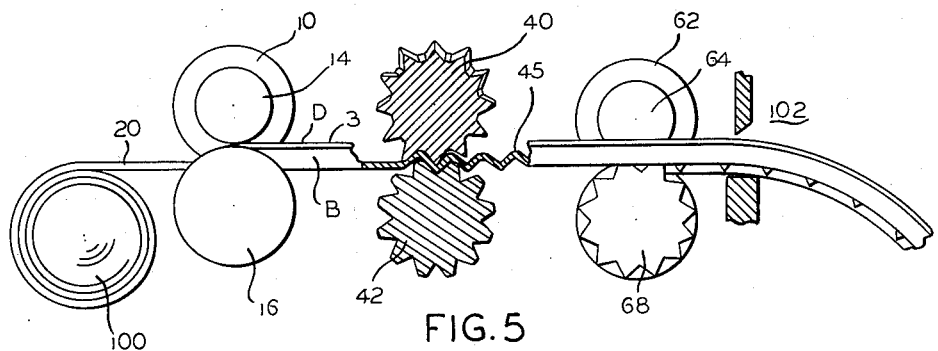
FIG. 5 is a diagrammatic illustration of the sequence of steps in the process of forming a circular foil pan from a strip of foil.

FIG. 5 diagrammatically illustrates a continuous process for forming foil pans from a continuous roll 100 of foil pan material 20 in accordance with this invention. The foil pan material 20 is initially and sequentally fed by hand through the rollers 10, 12, 14 and 16 forming the upper portion 3 then the rollers 40, 42 forming the triangular ribs 45, and finally through the rollers 62, 64, 66 and 68 forming the bottom shelf 60. It is initially required that the mentioned cooperating rollers be spread apart far enough so that the foil pan material 20 can be positioned between the cooperating rollers and then the rollers are returned to operating relationship with each other. This means that the front edge of foil pan material 20 is initially pulled into position between spread apart rollers 10, 12, 14 and 16 and these rollers are closed upon each other as shown in FIG. 1, the last mentioned rollers are then rotated forming the L-shaped upper portion 3 until the leading edge of the foil pan material 20 is positioned between spread apart rollers 40 and 42. The rollers 40 and 42 are then closed upon each other as shown in FIG. 2 thus beginning the formation of the triangular ribs 45. Rollers 40 and 42 and rollers 10, 12, 14 and 16 are then rotated forming the triangular ribs 45 and the L-shaped upper portion 3 in the foil pan material 20 until the leading edge is positioned between rollers 62, 64, 66 and 68. The rollers 62, 64, 66 and 68 are then closed upon each other with care being taken to properly index triangular slots 65 with the triangular ribs 45 as shown in FIG. 3.

After the initial setup, the foil pan material 20 is continuously fed from the roll 100 through the forming rolls 10, 12, 14 and 16 to form the surfaces B and D comprising the L-shaped top portion 3, then through the triangular rib forming rolls 40, 42 where the triangular ribs 45 are formed, and from there to the bottom shelf-forming rolls 62, 64, 66 and 68 where the shelf 60 is formed and thereafter through the cutting mechanism 102 diagrammatically illustrated in FIG. 5 which can be any form of cutting mechanism but which is shown in FIG. 5 as a guillotine-type cutting mechanism. The particular type of cutting mechanism utilized is not important and the details thereof do not contribuate to this invention.

Figure 6:
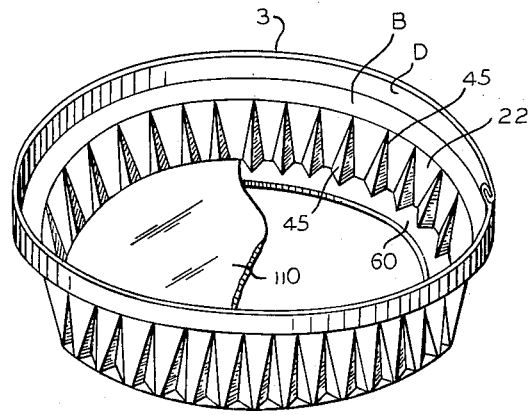
FIG. 6 is a perspective view of a circular foil pan formed by the process and from a strip of foil.
Figures 7, 8:
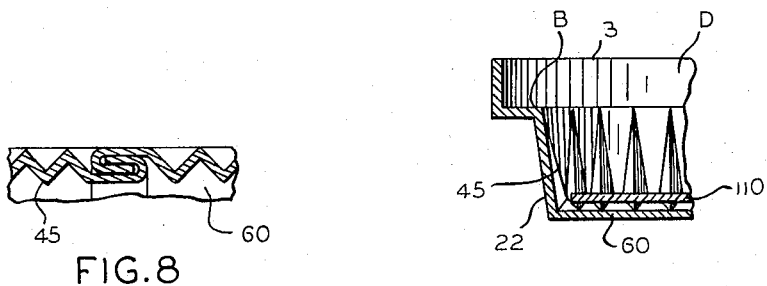
FIG. 7 is a partial cross-sectional view illustrating the seating of an independent bottom section on the shelf of the formed foil pan.
FIG. 8 is an enlarged cross-section view of the connection between the ends of the strip of foil used to form the circular foil pan.

FIG. 6 is a perspecive view of the assembled foil pan construction and is formed by taking the cut foil pan material after being formed on, for example, the line illustrated in FIG. 5, and connecting one end to the other end, as for example by the means shown in FIG. 8. The interlocking means illustrated in FIG. 8 can be formed by hand or can be formed by any other procedure. Any mechanism can be utilized to join one end of the formed foil pan material to the other end.

FIGS. 6 and 7 also illustrate a bottom member 110. The bottom member 110 is an independent part and can rest upon the bottom shelf portion 60 or it can be positioned on the bottom of the ribs 45 as shown in FIGS. 6 and 7 and if a cake, for example, is packaged in the disclosed foil pan construction, the cake can be readily lifted out of the foil pan construction by pushing up on the bottom portion 110 or if, in the case where this is not practical, the foil pan construction can be opened at its connecting portion, that is where one end is connected to the other, and just unwrapped from around the contained cake. This is a desirable feature, especially when the cake is large and lifting of the cake out of the foil pan construction is not practical.

The advantages of the foil pan construction made in accordance with the invention is that comparatively little material is wasted. Further, the triangular shaped ribs insure strength, and also, at the same time, provide for the tapering of the foil pan construction so that they can be nested for storage before they are used. Also, these foil pans are especially suited for cakes of a comparatively large size because the foil pan can be unwrapped from around the cake. Further, the construction of the foil pan enables bottoms to be used that can be made of inexpensive material such as, for example, cardboard. Also, if the cake is of a comparatively small size, the cake can be removed from the foil pan construction by merely lifting up on the bottom 110 which is being supported and lying on the shelf portion 60.

What has been disclosed is what is believed to be the preferred embodiment of the invention. However, many modifications and alterations can be made without departing from the scope of the invention and it is intended that the appended claims be limited only by the prior art.

I claim:

1. A process for forming a side wall structure of a pan from an elongated strip of foil material comprising the consecutive steps of:

forming a plurality of spaced impressions in said elongated strip to form a corrugated side wall of said pan;

bending said elongated strip along one edge thereof to extend substantially transversely of said side wall to form a bottom shelf adapted to support an independent bottom of said pan; and securing one end of said elongated strip to its other end whereby said bottom shelf constitutes an annular flange extending substantially transversely to and radially inwardly of said side wall.

2. A process for forming a sidewall of a pan from an elongated strip of foil material comprising the steps of:

forming said elongated strip along one edge thereof to form an upper cover receiving portion;

forming a plurality of spaced impressions in said elongated strip;

bending said elongated strip along the opposite edge from said mentioned edge to form a bottom shelf; and securing one end of said elongated strip to its other end.

3. A process for forming a side wall of a pan from an elongated strip of foil material comprising the steps of:

forming said elongated strip along one edge thereof to form an upper cover receiving portion;

forming a plurality of spaced impressions in the remainder of said elongated strip;

bending said elongated strip along the opposite edge from said mentioned edge to form a bottom shelf; and securing one end of said elongated strip to its other end.

4. A process for forming a side wall structure of a pan from an elongated strip of foil material comprising the consecutive steps of:

forming a plurality of spaced impressions in said elongated strip extending along lines substantially perpendicular to the edges of said elongated strip and each impression progressively deepening and expanding in width from one end of each impression to its opposite end to form a corrugated side wall of said pan;

bending said elongated strip along one edge thereof to form a bottom shelf adapted to support an independent bottom of said pan; and securing one end of said elongated strip to its other end whereby said bottom shelf constitutes an annular flange extending substantially transversely to and radially inwardly of said side wall.

5. A process for forming a side wall structure of a pan from an elongated strip of foil material comprising the consecutive steps of:

forming a plurality of spaced impressions in said elongated strip extending along lines substantially perpendicular to the edges of said elongated strip and each impression progressively deepening and expanding in width from one end of each impression to its opposite end to form a corrugated side wall of said pan;

bending said elongated strip along one edge thereof to form a flange at substantially a right angle with the remainder of said elongated strip, said flange adapted to support an independent bottom of said pan; and securing one end of said elongated strip to its other end.

6. A process for forming a side wall of a pan from an elongated strip of foil material comprising the steps of:

forming said elongated strip along one edge thereof to form an upper cover receiving portion;

forming a plurality of spaced impressions in said elongated strip extending along lines substantially perpendicular to the edges of said elongated strip and each impression progressively deepening and expanding in width from one end of each impression to its opposite end;

bending said elongated strip along the opposite edge from said mentioned edge to form a bottom shelf; and securing one end of said elongated strip to its other end.

7. A process for forming a side wall structure of a pan from an elongated strip of foil material comprising the consecutive steps of:

forming a plurality of spaced impressions in said elongated strip extending along lines substantially perpendicular to the edges of said elongated strip and each impression triangular in outline configuration with the depth of each impression uniformly deepening from one end of each impression to its opposite end to form a corrugated side wall of said pan;

bending said elongated strip along one edge thereof to extend substantially transversely of said side wall to form a bottom shelf adapted to support an independent bottom of said pan; and securing one end of said elongated strip to its other end.

8. A process for forming a side wall of a pan from an elongated strip of foil material comprising the steps of:
  forming said elongated strip along one edge thereof to form an upper cover receiving portion;
  forming a plurality of spaced impressions in said elongated strip extending along lines substantially perpendicular to the edges of said elongated strip and each impression triangular in outline configuration with the depth of each impression uniformly deepening from one end of each impression to its opposite end;
  bending said elongated strip along the opposite edge from said mentioned edge to form a bottom shelf; and
  securing one end of said elongated strip to its other end.

9. A process for forming a side wall of a pan from an elongated strip of foil material comprising the steps of:
  bending said elongated strip along one edge thereof to form a first surface perpendicular to the surface of the unbended portion of said strip and a second surface parallel to the surface of the unbended portion of said strip;
  forming a plurality of spaced impressions in said elongated strip extending along lines substantially perpendicular to the edge of said elongated strip and each impression triangular in outline configuration with the depth of each impression uniformly deepening from one end of each impression to its opposite end;
  bending said elongated strip along the opposite edge from said mentioned edge to form a flange at substantially a right angle with the unbended portion of said strip; and
  securing one end of said elongated strip to its other end.

10. A method of forming a substantially circular side wall structure of a pan comprising the consecutive steps of:
  providing an elongated strip of pan material;
  bending said material to form a flange at substantially a right angle with the remainder portion of said elongated strip, said flange adapted to support an independent bottom of said pan;
  forming a plurality of ribs in said remainder portion of said elongated strip to form a corrugated side wall of said pan; and
  joining one end of said elongated strip to the other end of said elongated strip whereby said flange constitutes a planar annular web extending transversely of and radially inwardly of said side wall to form a support for a bottom of said pan.

References Cited by the Examiner
UNITED STATES PATENTS

| | | | |
|---|---|---|---|
| 1,771,955 | 7/1930 | Fork et al. | 153—7 |
| 2,639,948 | 5/1953 | Grimshaw | 153—7 |

CHARLES W. LANHAM, *Primary Examiner.*

R. D. GREFE, *Examiner.*